(12) United States Patent
Hull et al.

(10) Patent No.: US 8,008,826 B2
(45) Date of Patent: Aug. 30, 2011

(54) BRUSHLESS MOTOR/GENERATOR WITH TRAPPED-FLUX SUPERCONDUCTORS

(75) Inventors: John R. Hull, Sammamish, WA (US); Michael Strasik, Sammamish, WA (US)

(73) Assignee: The Boeing Company, Chicago, IL (US)

(*) Notice: Subject to any disclaimer, the term of this patent is extended or adjusted under 35 U.S.C. 154(b) by 374 days.

(21) Appl. No.: 12/190,288

(22) Filed: Aug. 12, 2008

(65) Prior Publication Data

US 2010/0038986 A1    Feb. 18, 2010

(51) Int. Cl.
*H02K 19/26* (2006.01)
(52) U.S. Cl. ........... 310/181; 310/179; 310/52; 505/166
(58) Field of Classification Search ........... 310/216.045, 310/165, 181, 179, 52; 505/121, 166, 124
See application file for complete search history.

(56) References Cited

U.S. PATENT DOCUMENTS

| | | | |
|---|---|---|---|
| 5,350,958 A * | 9/1994 | Ohnishi | 310/52 |
| 6,815,863 B1 | 11/2004 | Jack et al. | |
| 2004/0160140 A1 * | 8/2004 | Shoykhet | 310/179 |
| 2005/0248222 A1 * | 11/2005 | Evangelos et al. | 310/54 |
| 2006/0055274 A1 * | 3/2006 | Kim | 310/216 |

FOREIGN PATENT DOCUMENTS

| | | |
|---|---|---|
| DE | 198 47 591 | 10/1998 |
| DE | 102005017517 | 4/2005 |
| GB | 1 467 871 | 3/1977 |

OTHER PUBLICATIONS

UK Search Report in GB Application No. 0913980.9 dated Dec. 11, 2009; 2 pages.

* cited by examiner

*Primary Examiner* — Quyen Leung
*Assistant Examiner* — Leda Pham
(74) *Attorney, Agent, or Firm* — Hope Baldauff Hartman, LLC

(57) ABSTRACT

Apparatus and methods provide for a high specific power electro-dynamo device that utilizes high-temperature superconductors, a dysprosium core, and superconducting coils to provide power. According to various embodiments, a rotor includes a number of rotor arms with a high-temperature superconductor attached to each arm. A stator includes a number of stator arms with stator coils wrapped around each arm. The stator coils may include superconducting wires for providing a charge to the high-temperature superconductors and non-superconducting wires for inducing a voltage from the trapped flux provided by the superconductors during operation in generator mode. The dysprosium core maximizes the magnetic flux saturated by the core while providing additional safety measures during operation. A backup power wheel or permanent magnets positioned in series with the high-temperature superconductors may provide emergency power at non-cryogenic temperatures.

20 Claims, 6 Drawing Sheets

BRUSHLESS MOTOR/GENERATOR WITH TRAPPED-FLUX SUPERCONDUCTORS

BACKGROUND

Motors and generators are used in a large variety of applications. Electro-dynamo devices include generators that produce current through the use of rotating coils of wire that turn within magnetic fields created by permanent magnets or electromagnets. These devices operate as motors when the coils are energized to react with the magnetic fields from the permanent magnets or electromagnets, which creates a torque in an attached shaft. Electro-dynamo devices are often utilized within vehicles, such as aircraft, where size and weight of a power-generating system is a significant consideration. In these applications, it is desirable to maximize the specific power of an electro-dynamo device to minimize the overall weight of the device. However, permanent magnets and electromagnets are limited in the amount of magnetic flux produced when the electro-dynamo device is sized for use within a vehicle.

Superconducting solutions include utilizing superconducting wires to generate the primary magnetic flux of an electro-dynamo device. Although doing so increases the specific power, or power output per unit of weight, of the device as compared to a device utilizing permanent magnets or electromagnets to generate the flux, the design of a typical superconductive device becomes complicated due to the requirements for getting cryogenic coolant and current into the rotating device where the superconducting wires are positioned. Moreover, these existing designs generally operate at temperature ranges of 20-40 K, which requires heavy and complex cryogenic systems that are impractical for many vehicle applications such as use in commercial aircraft.

It is with respect to these considerations and others that the disclosure made herein is presented.

SUMMARY

It should be appreciated that this Summary is provided to introduce a selection of concepts in a simplified form that are further described below in the Detailed Description. This Summary is not intended to be used to limit the scope of the claimed subject matter.

Apparatus and methods described herein provide for the utilization of rotating high-temperature superconductors to provide magnetic flux to stationary coils at a high specific power to provide electricity in generator mode and rotational torque in motor mode. According to one aspect of the disclosure provided herein, an electro-dynamo device includes a stator with a number of stator arms and a rotor with a number of rotor arms attached to a shaft. High-temperature superconductors are attached to the rotor arms and provide trapped magnetic flux to stator coils that are attached to the stator arms as the rotor rotates to create current in the stator coils during operation as a generator. Energizing the stator coils according to the angular rotation of the rotor during operation as a motor creates a torque on the shaft. The cores of the rotor and the stator are of a material that has ferromagnetic properties at cryogenic temperatures and paramagnetic properties at non-cryogenic temperatures.

According to another aspect, an electro-dynamo device has a rotor with a dysprosium core and bulk high-temperature superconductors attached to arms of the rotor. A stator also has a dysprosium core and a number of stator arms. The stator arms have attached stator coils that have superconducting wires and non-superconducting wires. The superconducting wires provide a charging magnetic flux to the bulk high-temperature superconductors, while the non-superconducting arms produce current when subjected to trapped magnetic flux from the bulk high-temperature superconductors during rotation of the rotor.

According to yet another aspect, a method for providing electrical generation includes positioning a rotor with a dysprosium core material and rotor arms within a cylindrical stator. The stator has a dysprosium core material and a group of stator arms that are evenly spaced from the rotor arms. A group of bulk high-temperature superconductors are positioned on the rotor arms near an air gap that separates each rotor arm from each stator arm. Stator coils are positioned around the stator arms and configured to provide a magnetic flux to the bulk high-temperature superconductors through the dysprosium core for charging when receiving a current and to create a current when exposed to rotating magnetic fields from the bulk high-temperature superconductors when the rotor is rotating.

The features, functions, and advantages that have been discussed can be achieved independently in various embodiments of the present invention or may be combined in yet other embodiments, further details of which can be seen with reference to the following description and drawings.

DETAILED DESCRIPTION

The following detailed description is directed to apparatus and methods for creating electricity with a generator utilizing trapped-flux superconductors. As discussed briefly above, the specific power of a generator is typically inversely proportional to the weight of the generator. Utilizing the concepts and technologies described herein, high-temperature superconductors positioned on a rotor are utilized to provide a magnetic flux to a number of stator coils. A ferromagnetic core material with a high magnetic saturation value at the cryogenic operating temperatures of the generator devices described herein allows for sufficient magnetic flux to be trapped in the super conductors to provide a magnetic flux that is significantly higher than conventional generator devices.

Throughout this disclosure, embodiments are described utilizing the terms "electro-dynamo device," "generator," and "motor." These terms are used synonymously to describe a device that utilizes an interaction between trapped-flux superconductors and a number of coils to induce a current in the coils or to induce a mechanical torque in a shaft according to the configurations of the various embodiments described below. Additionally, embodiments are described with respect to electro-dynamo devices utilized within aircraft. An aircraft environment provides a useful example for embodiments described herein since reducing weight of an aircraft is a universal objective and increasing the specific power of an electro-dynamo device is effective in reducing its size and weight. However, it should be understood that the concepts presented herein are equally applicable to electro-dynamo systems within any platform, including ships, vehicles, or any other platform in which an electro-dynamo device having a high specific power is desirable.

Figure 1:
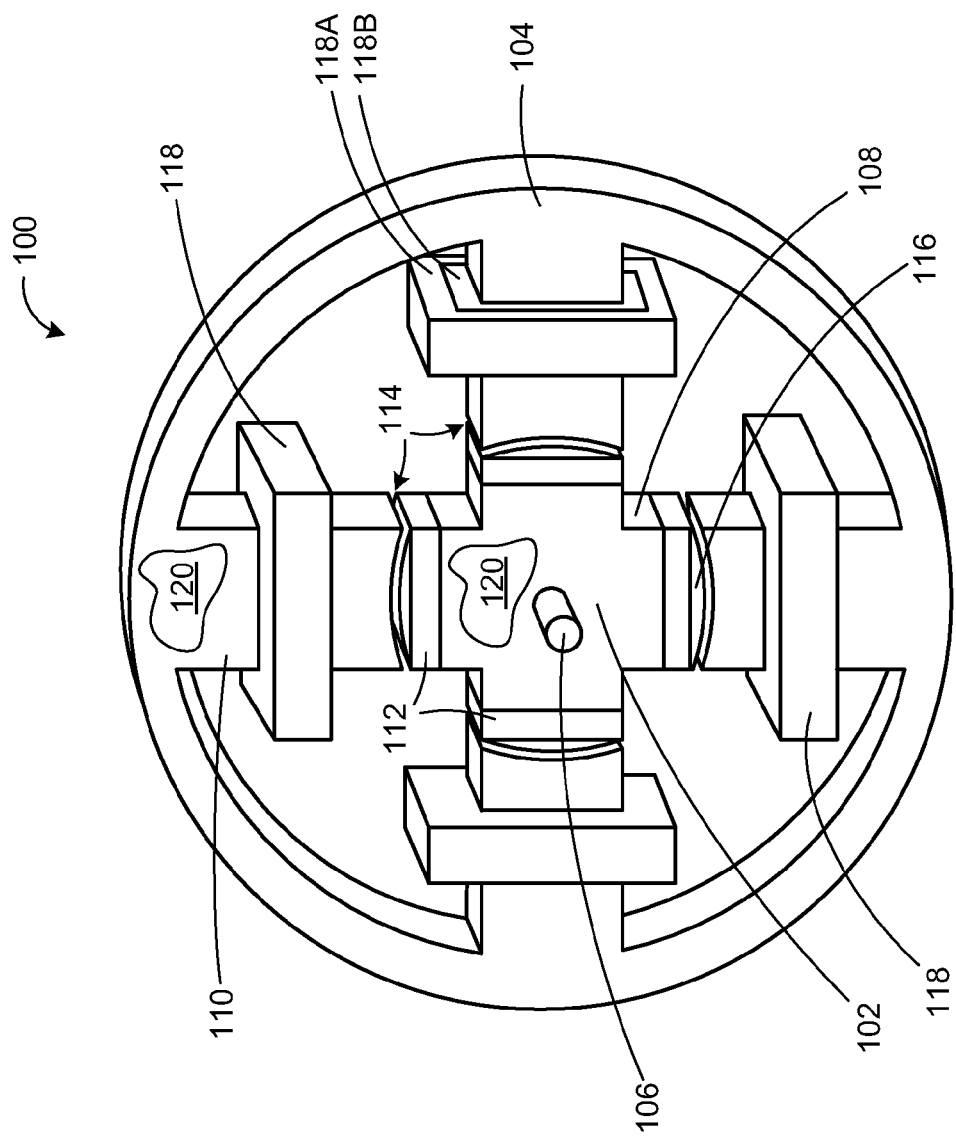
FIG. 1 is a perspective view of a generator showing a generator configuration according to various embodiments presented herein.

In the following detailed description, references are made to the accompanying drawings that form a part hereof, and which are shown by way of illustration, specific embodiments, or examples. Referring now to the drawings, in which like numerals represent like elements through the several figures, an electro-dynamo device utilizing trapped-flux superconductors will be described. FIG. 1 shows an electro-dynamo device 100 according to one embodiment. The electro-dynamo device 100 includes a rotor 102 and a stator 104. The rotor 102 is rigidly connected to a shaft 106 that spins the rotor 102 within the fixed stator 104. One end of the shaft 106 is connected to a source of rotational torque and the opposing end of the shaft 106 may rest in a bearing. The electro-dynamo device 100 shown in FIG. 1 is configured with four rotor arms 108 and four corresponding stator arms 110. However, it should be appreciated that any even number of rotor arms 108 and stator arms 110 may be utilized without departing from the scope of this disclosure. Additionally, it should also be appreciated that the number of rotor arms 108 and the number of stator arms 110 may not be equivalent.

Each rotor arm 108 includes a superconductor 112. According to various embodiments, the superconductors 112 are bulk high-temperature superconductors. According to one implementation, the high-temperature superconductors include Y—Ba—Cu—O, with large grain size and high critical current density. The superconductors 112 are positioned on the rotor arms 108 proximate to an air gap 114 that separates each rotor arm 108 from a corresponding stator arm 110. To maintain a uniform air gap 114 between the rotor 102 and the stator 104, the embodiment shown in FIG. 1 utilizes rotor end caps 116 on the end of each rotor arm 108. The rotor end caps 116 are shaped to maintain the distance between the rotor arms 108 and the stator arms 110 as the rotor 102 is rotated. The rotor end caps 116 may be bonded or otherwise attached to the superconductors 112. In an alternative embodiment, the superconductors 112 are shaped to maintain the desired air gap 114 without the use of the rotor end caps 116.

A stator coil 118 is positioned around each stator arm 110. According to one embodiment, the stator coil includes superconducting wires 118A. As one example, the superconducting wires 118A may include a YBCO thick film on a metallic substrate. The superconducting wires 118A are advantageous when magnetizing the superconductors 112. The superconducting wires 118A receive a direct current and produce a magnetic flux that is used to charge, or magnetize, the superconductors 112. The magnetic flux generated by the superconducting wires 118A is greater than that created by conventional copper wires.

However, when the electro-dynamo device 100 is operating, i.e. in generator mode, after charging the superconductors 112, the superconducting wires 118A may experience losses due to the changes in the magnetic flux that they are subjected to. To shield the superconducting wire 118A from these losses, an alternative embodiment utilizes a set of conventional copper wires 118B nested within the superconducting wire 118A. This effectively creates a superconducting coil and a copper coil. The superconducting coil may be utilized to charge the superconductors 112, while the copper coil is used during operation of the electro-dynamo device 100 in generator mode. According to one embodiment, the copper wires 118B include LITZ wire. It should be appreciated that the stator coils 118 may alternatively include only conventional copper wires 118B without any superconducting wires 118A. The magnetic flux trapped by the superconductors 112 in this alternative embodiment would be less than the amount of flux trapped when using superconducting wires 118A.

The rotor 102 and the stator 104 include a core material 120 that is ferromagnetic in cryogenic temperatures. According to various embodiments, the ferromagnetic core material 120 is dysprosium. Conventional rotor 102 and stator 104 cores are manufactured from an iron or steel material. However, the magnetic saturation value of iron limits the amount of flux that can be provided to the superconductors 112 for charging. Dysprosium provides a very high magnetic saturation value that allows for the transfer of a significantly higher magnetic flux from the superconducting stator coils 118 to the high-temperature superconductors 112 than would be possible using iron as the core material 120. Additionally, the dysprosium allows for a similarly high level of magnetic flux to be transmitted through the stator core to the stator coils 118. It is estimated that the use of dysprosium as a core material 120 approximately doubles the amount of magnetic flux possible within the core material 120 than if conventional iron were used as the core material 120.

A benefit of dysprosium is that the high magnetic saturation properties may be obtained at cryogenic temperatures that are approximately 80 K and below. Because the characteristics of the high-temperature superconductors 112 allow for operation around this temperature, such as operation at 77 K, the heavy and complex cryogenic cooling systems associated with conventional superconducting generators that operate at temperatures of 20-40 K are not required. In fact, 77 K is typically the temperature of liquid nitrogen, which can be used to cool the generator 100 to provide for simpler, lighter, and more reliable cryocooler technology.

Dysprosium additionally provides additional safety mechanisms not present when traditional core materials 120 such as iron are used. For example, as discussed above, in a conventional brushless generator that utilizes permanent magnets to provide a magnetic flux, iron may be used as the core material 120 of the rotor 102 and stator 104. With this type of conventional generator, if a coil gets shorted out and the permanent magnets keep turning, then the stator 104 will continue to heat up and may eventually cause a fire or significant damage to the generator.

However, utilizing embodiments described herein with dysprosium, or another core material 120 with magnetic characteristics similar to dysprosium, the electro-dynamo device 100 is much less susceptible to fire or other damage as a result of a shorted stator coil 118. This result is due to the magnetic characteristics of dysprosium. Because dysprosium is highly paramagnetic at room temperature, if the cooling system fails or is turned off, or in the event of a stator coil 118 short, then the resulting heating of the dysprosium core material 120 will reduce the magnetic qualities of the dysprosium and consequently reduce the amount of heating in the shorted out stator coil 118. Moreover, because the embodiments described herein utilize high-temperature superconductors 112, any heating above the critical temperature of the superconductors 112 will dissipate any trapped magnetic flux, which will prevent overheating of the stator 104 and any associated fire hazards.

It should be appreciated that the embodiments described herein are not limited to the configuration of the electro-dynamo device 100 shown in FIG. 1. For example, in an alternative embodiment, the rotor 102 and the stator 104 may be reversed such that the rotor 102 rotates around the stator 104, which is fixed in the center of the rotor 102. Moreover, the superconductors 112 and stator coils 118 may be reversed in either embodiment such that the stator coils 118 rotate while the superconductors 112 are fixed.

In operation, the electro-dynamo device 100 shown in FIG. 1 first undergoes a charging process during which the superconductors 112 are magnetized. There are various methods for charging the superconductors 112. First, according to one embodiment, the rotor 102 is held stationary so that the rotor arms 108 align with the stator arms 110. The stator coils 118 are then energized with direct current to produce a magnetic flux while the temperature of the superconductors 112 is above the critical temperature. Once the temperature of the superconductors 112 lowers sufficiently and are magnetically charged, the stator coils 118 are de-energized and the rotor 102 is released to rotate. Rather than hold the rotor arms 108 stationary so that they align with the stator arms 110, in an alternative embodiment, the stator coils 118 are energized and the rotor arms 108 will automatically align themselves with the stator arms 110 as a result of the induced magnetic flux in the stator coils 118.

Cryogenic cooling techniques discussed below are utilized to cool the superconductors 112 below their critical temperature. As the superconductors 112 cool below their critical temperatures, they will magnetize in the direction of the applied magnetic flux. The flux that is present when the superconductors 112 obtain their critical temperature is trapped within the superconductors 112. This field-cooling technique may be used to maximize the amount of trapped magnetic flux within the superconductors 112. Assuming a high critical current density of the superconductors 112, the superconductors 112 will be uniformly magnetized in the center with a small perimeter region in which the magnetization falls to zero at the edge faces of the superconductors 112.

According to another embodiment, rather than energizing the stator coils 118 prior to cooling the superconductors 112 below their critical temperature, the high-temperature superconductors 112 can be first cooled below their critical temperature. The stator coils 118 may then be pulsed one or more times to provide a magnetic flux for charging the superconductors 112. This non-field cooling technique generally produces a smaller quantity of trapped flux within the superconductors 112 than compared with the field-cooling technique described above. Once the superconductors 112 are magnetized, the rotor 102 spins and the changing magnetic flux in the stator arms 110 induces a voltage in the stator coils 118, enabling the device to function as a generator.

Figure 2:
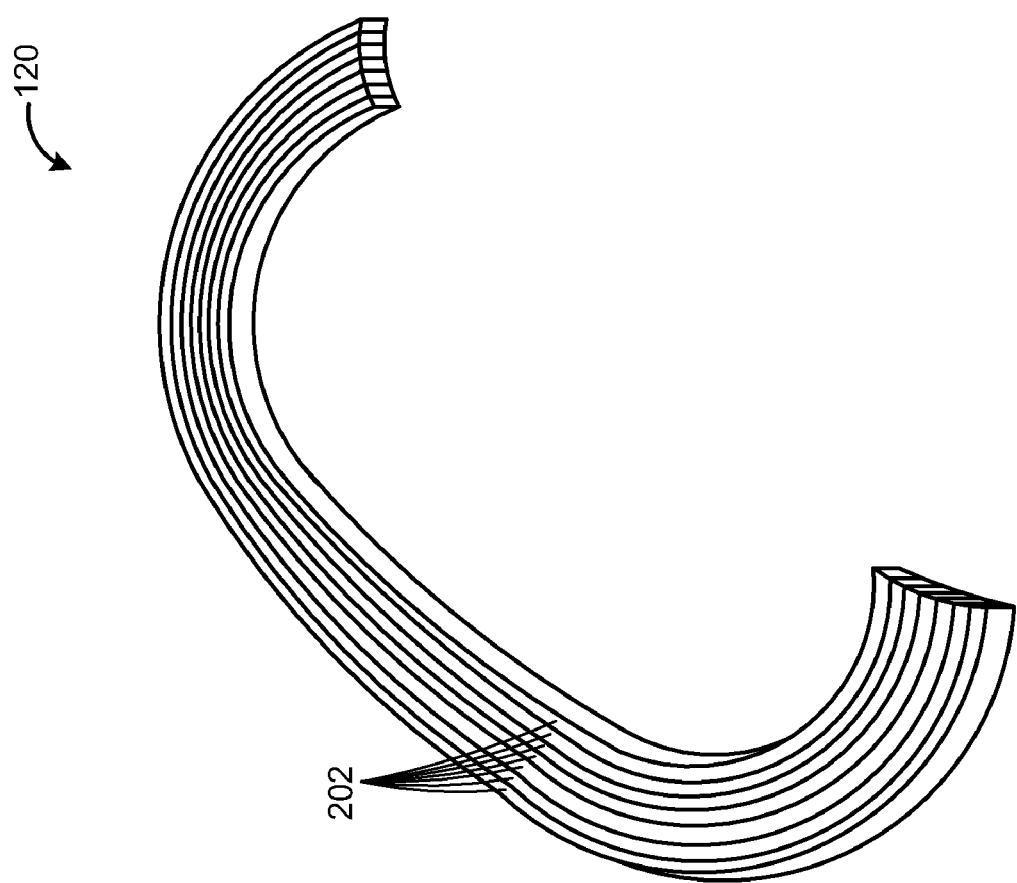
FIG. 2 is a perspective view of a portion of a generator stator showing a laminated strip configuration of core material according to various embodiments presented herein.

Turning now to FIG. 2, the core material 120 of the rotor 102 and the stator 104 will be described. As discussed above, the core material 120 includes dysprosium or other similar ferromagnetic material for its high magnetic saturation properties at cryogenic temperatures. The dysprosium is magnetically anisotropic and will utilize its magnetic properties best if the easy axis of magnetization is in the direction that the magnetic field wants to flow. According to the embodiment shown in FIG. 2, this is accomplished in the stator 104 by forming laminated strips 202 with the easy axis along the length of the laminated strips 202. The laminated strips 202 can be bent to form a quarter of the stator core, as shown. Laminated strips 202 may be similarly utilized to create the rotor core in any desired configuration.

As described above, dysprosium becomes paramagnetic when operating at temperatures above cryogenic temperatures. As a result, when the cooling system fails, the capacity of the dysprosium to provide a magnetic field is reduced. An alternative embodiment of the disclosure provided herein provides for some amount of emergency power to be generated in these scenarios by commingling or interspersing iron laminated strips among the dysprosium laminated strips in the core material 120. For example, in FIG. 2, every other laminated strip 202 may include dysprosium while the remaining laminated strips 202 include iron. It should be appreciated that any types of core materials 120 may be commingled in any configuration to conduct magnetic flux in the generator circuit under any applicable operating parameters.

Figure 3:
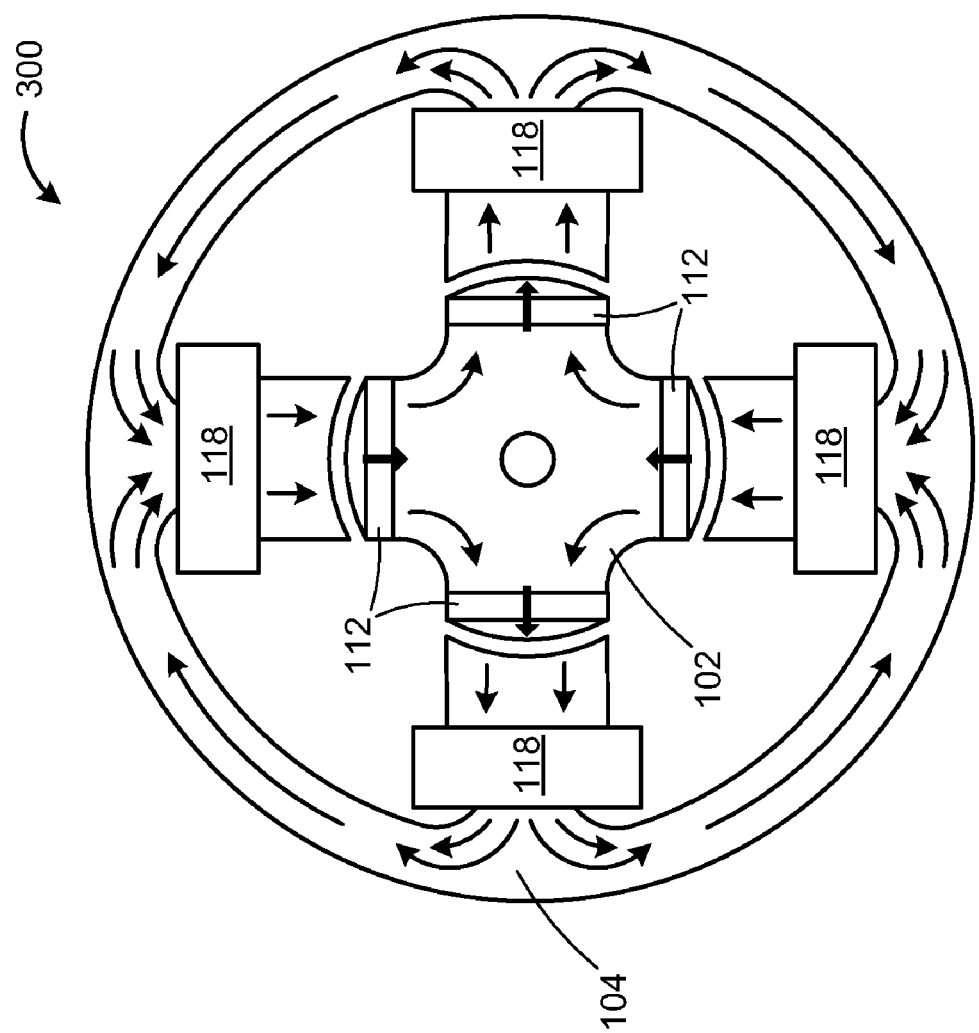
FIG. 3 is a front view of a generator showing flow directions of magnetic flux according to various embodiments presented herein.

FIG. 3 shows a magnetic flow configuration 300, illustrating the flow directions of magnetic flux according to various embodiments presented herein. The arrows represent the flow of magnetic flux through the high-temperature superconductors 112, core material 120, and stator coils 118. According to this example, two of the diametrically opposed high-temperature superconductors 112 are magnetized such that with the flux moving toward the rotor 102, while the other two diametrically opposed high-temperature superconductors 112 are magnetized such that the flux is moving away from the rotor 102 toward the stator 104. In doing so, when the rotor 102 spins, the changing magnetic flux in the stator arms 110 induces a desired voltage in the stator coils 118.

Figure 4:
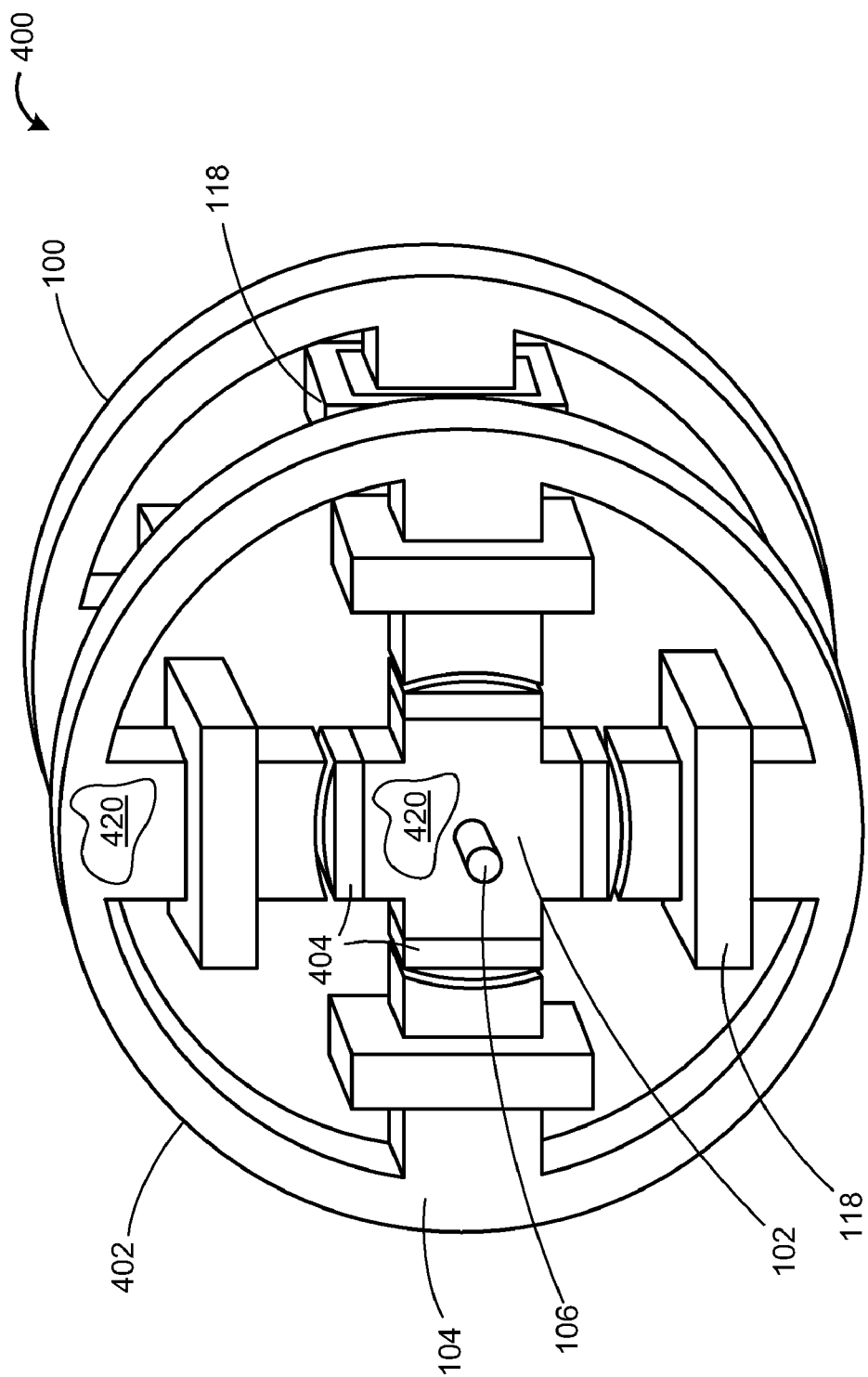
FIG. 4 is a perspective view of a generator showing a backup generator component according to various embodiments presented herein.

FIG. 4 shows an emergency power configuration 400 according to an alternative embodiment. While the electro-dynamo device 100 described above is a high specific power solution to power generation on an aircraft or other vehicle, the capability of the electro-dynamo device 100 to produce power may be significantly diminished in the event of a cryo-cooler failure. In such a situation, the emergency power configuration 400 provides for the ability to produce power without the superconductors 112. According to this embodiment, a series of power wheels may be connected to the same rotatable shaft 106. One or more of the power wheels may be configured as the electro-dynamo device 100 shown in FIG. 1. One or more additional power wheels may be configured as the backup power wheel 402 shown here. The backup power wheel 402 is configured similar to the electro-dynamo device 100, but with the superconductors 112 replaced with permanent magnets 404 and the core material 120 replaced with iron, steel, or other suitable conventional core material 420. The stator coils 118 include copper wires or other non-superconducting wires. In this manner, the permanent magnets 404 may still provide the magnetic flux required to the stator coils 118 in order to produce and provide emergency power to essential systems.

Figure 5:
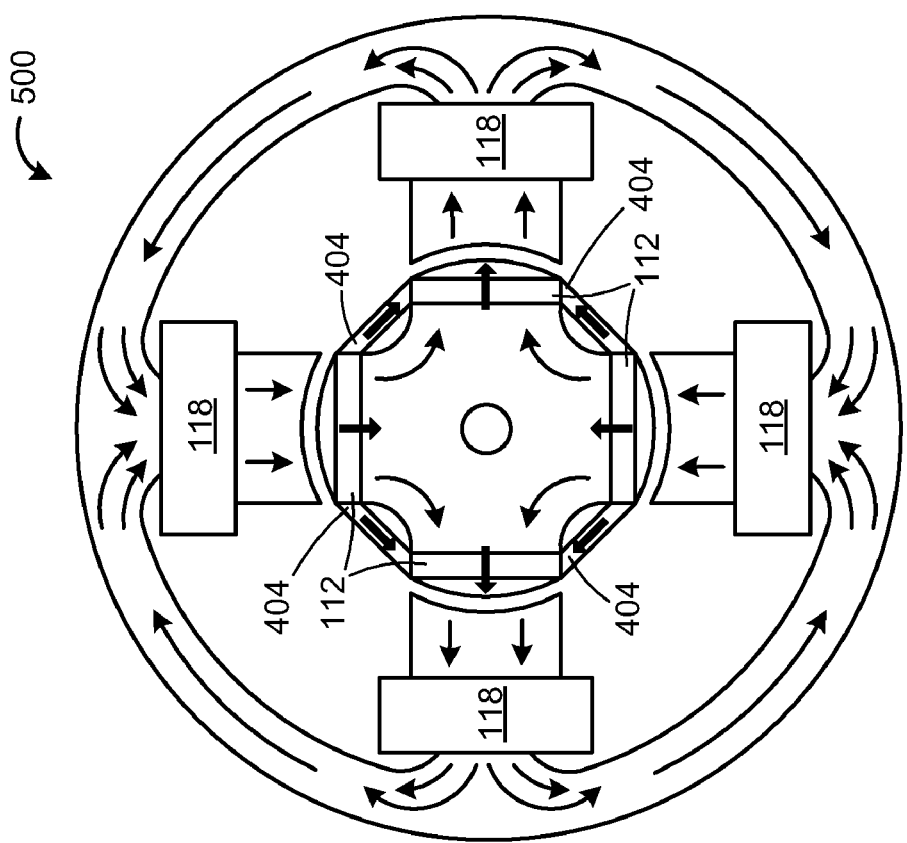
FIG. 5 is a front view of a generator showing permanent magnets configured as alternative sources of magnetic flux and various flow directions of magnetic flux according to various embodiments presented herein.

Another emergency power solution is shown in FIG. 5. This emergency power configuration 500 allows for emergency power to be generated when only a single wheel is used on a rotatable shaft 106. In this embodiment, permanent magnets 404 are used in parallel with the high-temperature superconductors 112 within the magnetic circuit that is created by the electro-dynamo device 100. By doing so, if the temperature of the high-temperature superconductors 112 rises above the critical temperature, then the permanent magnets 404 may provide a reserve amount of magnetic flux that can generate a voltage in the stator coils 118.

The permanent magnets 404 are positioned between the rotor arms 108 such that one end of a permanent magnet 404 abuts a side of a rotor arm 108, while the opposing end of the permanent magnet 404 abuts a side of an adjacent rotor arm 108. The direction of magnetic flux flow is shown with the arrows. With this configuration, part of the flux from the permanent magnets 404 may be short circuited through the core material 120 of the rotor 102, but part of the flux will go through the core material 120 of the stator 104 to the stator coils 118 during emergency power situations. It should be appreciated that the location of the permanent magnets 404 is not limited to the configuration shown in FIG. 5. For example, the permanent magnets 404 may alternatively be positioned in-line with and inward of the high-temperature superconductors 112, but with less efficiency than the emergency power configuration 500 shown since the high-temperature superconductors 112 would act as an air gap if located between the permanent magnets 404 and the stator coils 118.

Cooling the electro-dynamo device 100 may occur in any number of possible ways. According to one embodiment, the cold head of a cryocooler is attached to the stator housing. With the electro-dynamo device 100 warm, the stator 104 will cool down first. Residual gas, such as helium or neon, acts to transfer heat from the rotor 102 to the stator 104. The cold head may be mounted near the top of the device to allow for gravity plus the thermal gradient to induce thermal convection to occur. Because the thermal conductivity of the high-temperature superconductors 112 is significantly less than that of the ferromagnetic core material 120, the high-temperature superconductors 112 will be the last element to cool. As a result, the dysprosium in the rotor 102 and the stator 104, plus the superconducting wires 1118A, will cool to operating temperatures before the high-temperature superconductors 112. Therefore, the maximum amount of magnetic flux will be available to magnetize the high-temperature superconductors 112 using the field-cooled technique described above.

Alternatively, a liquid coolant such as liquid nitrogen, or cold gaseous helium or neon, may be passed through coolant passages in the stator 104 for cooling. Another alternative cooling technique includes passing cold helium or neon gas through the rotatable shaft 106 into a gap area between the stator housing and the rotor 102. Because the stator 104 operates at a cryogenic temperature, thermal insulation is used between the stator housing and a device housing (housings not shown). It should be appreciated that a combination of the above cooling techniques, as well as any other technique, may be utilized to arrive at and maintain the operating temperature of the electro-dynamo device 100.

Figure 6:
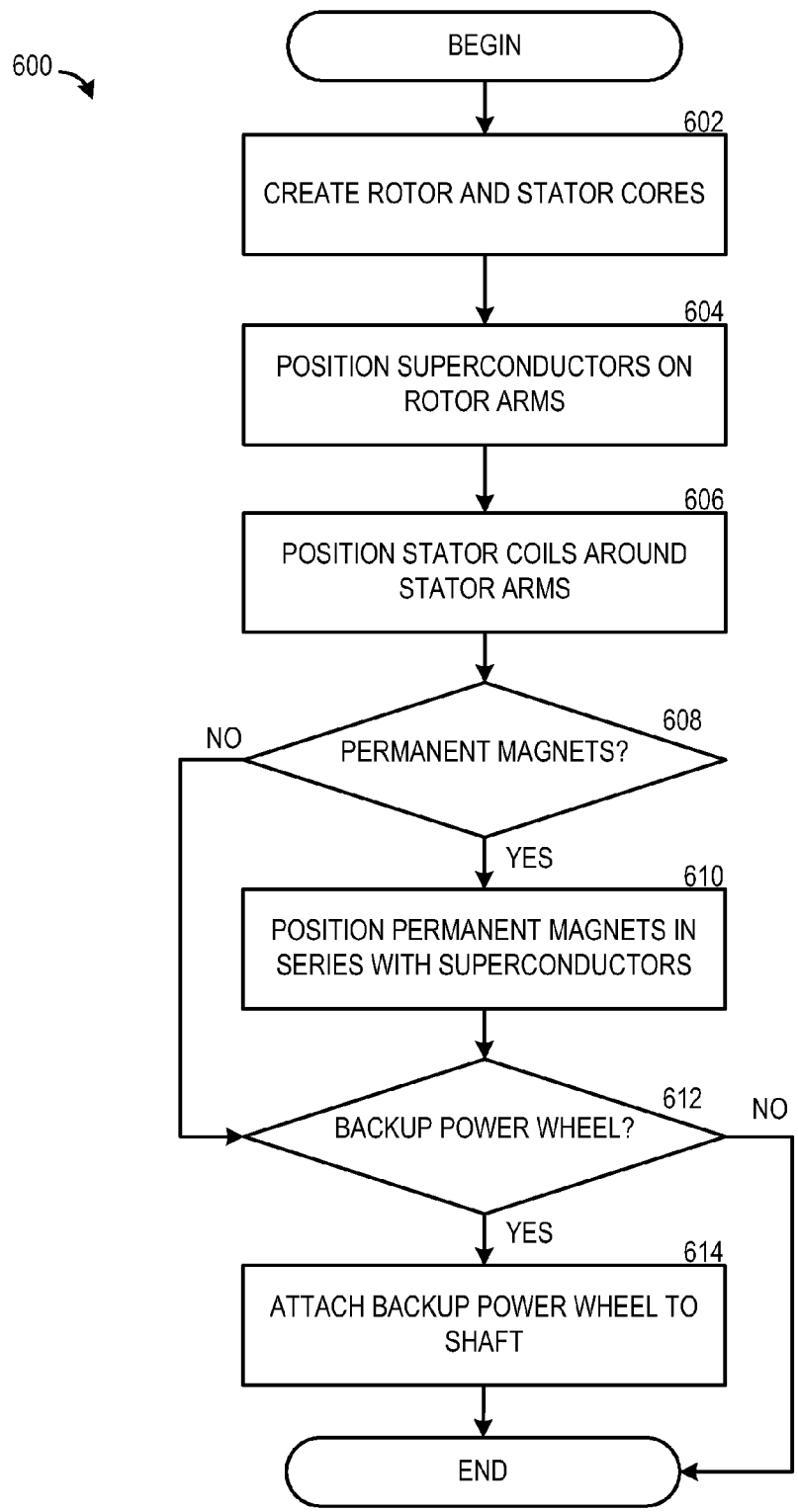
FIG. 6 is a flow diagram illustrating a method for providing for electrical generation according to various embodiments presented herein.

Turning now to FIG. 6, an illustrative routine 600 for providing electrical generation will now be described in detail. The routine 600 will be described with respect to the electro-dynamo device 100 shown in FIG. 1. It should be appreciated that more or fewer operations may be performed than shown in the figures and described herein. These operations may also be performed in a different order than those described herein.

The routine 600 begins at operation 602, where the rotor 102 and stator 104 are created using the desired core material 120. As discussed above, the core material 120 may be created using laminated strips 202 of dysprosium, either alone or in combination with iron or other conventional material. The strips may be configured such that an easy axis of magnetization of each laminated strip 202 is in a direction corresponding to a direction of a desired magnetic field flow. At operation 604, the high-temperature superconductors 112 are positioned in or on the rotor arms 108. Rotor end caps 116 may be added to obtain the desired air gap 114 dimensions if the superconductors 112 are not properly formed.

From operation 604, the routine 600 continues to operation 606, where the stator coils 118 are positioned around the stator arms 110. The stator coils 118 may include superconducting wires 118A, as well as copper or other traditional wires 118B. At operation 608, the routine diverges according to whether or not permanent magnets 404 are to be used for emergency power. If not, then the routine 600 proceeds to operation 612 and continues as described below. However, if permanent magnets 404 are to be used, then the routine 600 continues from operation 608 to operation 610 and the permanent magnets 404 are positioned in series with the high-temperature superconductors 112 as described above.

From operation 610, the routine 600 continues to operation 612, where it again diverges according to whether or not a backup power wheel 402 is to be used. If not, then the routine 600 ends. However, if a backup power wheel 402 is to be used for emergency power generation purposes, then the backup power wheel 402 is created and attached to the rotatable shaft 106 along with at least one other electro-dynamo device 100 that utilizes the concepts described above, and the routine 600 ends.

Based on the foregoing, it should be appreciated that technologies for creating and utilizing a high specific power electro-dynamo device are provided herein. Utilizing the embodiments described herein, large amounts of power may be created from a relatively small, lightweight device that is optimal for use in aircraft and other vehicles in which minimizing the size and weight of power generation devices is desirable. By utilizing high-temperature superconductors in combination with a dysprosium core material and superconducting wires within the stator coils, an electro-dynamo device can be efficiently operated at temperatures in the cryogenic range of approximately 80 K as opposed to the 20-40 K required by conventional superconducting generators. This allows for simpler and lighter cryogenic cooling mechanisms to be used. Moreover, the magnetic characteristics of dysprosium maximize the magnetic flux produced at operating temperatures while providing for a safety mechanism that will prevent stator overheating and fires caused by short circuiting or loss of cooling systems. The disclosed configurations of the electro-dynamo device 100 provide for backup emergency power mechanisms that will provide emergency power in the event that cooling systems fail and the high-temperature superconductors demagnetize.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. An electro-dynamo device, comprising:
    a stator comprising a plurality of stator arms and a stator core characterized by ferromagnetic properties at cryogenic operating temperatures and paramagnetic properties at non-cryogenic temperatures;
    a plurality of stator coils attached to the plurality of stator arms;
    a rotor connected to a rotatable shaft, the rotor comprising a plurality of rotor arms and a rotor core characterized by ferromagnetic properties at cryogenic operating temperatures and paramagnetic properties at non-cryogenic temperatures; and
    a plurality of high-temperature superconductors attached to the plurality of rotor arms,
    wherein the rotor is configured to rotate with respect to the stator such that the plurality of high-temperature superconductors interact with the plurality of stator coils to produce a current in the plurality of stator coils when operating in a generator mode and to provide torque on the rotatable shaft when operating in a motor mode.

2. The electro-dynamo device of claim 1, wherein the stator core and the rotor core comprise dysprosium.

3. The electro-dynamo device of claim 2, wherein the stator core and the rotor core are configured in dysprosium laminated strips such that an easy axis of magnetization of each strip is in a direction corresponding to a direction of a desired magnetic field flow.

4. The electro-dynamo device of claim 3, wherein the stator core and the rotor core further comprise iron laminated strips comingled with the dysprosium laminated strips to provide magnetic flux at operating temperatures higher than cryogenic operating temperatures.

5. The electro-dynamo device of claim 1, wherein the plurality of stator coils comprises superconducting wires and wherein the electro-dynamo device is further configured to magnetize the plurality of high-temperature superconductors using direct current received through the superconducting wires to provide a magnetic flux through the stator core and the rotor core to the plurality of high-temperature superconductors to create the trapped magnetic flux within the plurality of high-temperature superconductors.

6. The electro-dynamo device of claim 5, wherein the plurality of stator coils further comprises copper wires such that the superconducting wires are operative to magnetize the plurality of high-temperature superconductors and the copper wires are operative to produce the current when the electro-dynamo device is operating in the generator mode.

7. The electro-dynamo device of claim 1, further comprising an integrated backup power generation mechanism operative to generate electricity.

8. The electro-dynamo device of claim 7, wherein the rotor core is rigidly connected to a rotatable shaft and wherein the integrated backup power generation mechanism comprises:
 a backup stator comprising a plurality of backup stator arms;
 a plurality of backup stator coils attached to the plurality of backup stator arms;
 a backup rotor comprising a plurality of backup rotor arms, wherein the backup rotor is rigidly connected to the rotatable shaft; and
 a plurality of permanent magnets attached to the plurality of backup rotor arms,
 wherein the backup rotor is configured to rotate with respect to the backup stator such that the plurality of permanent magnets interact with the plurality of backup stator coils to produce a current in the plurality of backup stator coils when operating in the generator mode and to provide torque on the rotatable shaft when operating in the motor mode.

9. The electro-dynamo device of claim 7, wherein the integrated backup power generation mechanism comprises a plurality of permanent magnets attached to the rotor.

10. The electro-dynamo device of claim 9, wherein a permanent magnet is attached to the rotor between the plurality of rotor arms such that one end of the permanent magnet abuts a rotor arm and an opposing end of the permanent magnet abuts an adjacent rotor arm.

11. The electro-dynamo device of claim 9, further comprising a cooling mechanism for providing a cryogenic operating temperature.

12. A electro-dynamo device, comprising:
 a rotor comprising a dysprosium rotor core and a plurality of rotor arms;
 a plurality of bulk high-temperature superconductors attached to the plurality of rotor arms;
 a stator comprising a dysprosium stator core and a plurality of stator arms; and
 a plurality of stator coils attached to the plurality of stator arms, the plurality of stator coils comprising
  superconducting wires operative to provide a charging magnetic flux to the plurality of bulk high-temperature superconductors when receiving a current, and
  non-superconducting wires operative to produce a current when subjected to a trapped magnetic flux from the plurality of bulk high-temperature superconductors during rotation of the rotor.

13. The electro-dynamo device of claim 12, further comprising an integrated backup power generation mechanism operative to generate electricity.

14. The electro-dynamo device of claim 13, wherein the rotor core is rigidly connected to a rotatable shaft and wherein the integrated backup power generation mechanism comprises:
 a backup stator comprising a plurality of backup stator arms;
 a plurality of backup stator coils attached to the plurality of backup stator arms;
 a backup rotor comprising a plurality of backup rotor arms corresponding to the plurality of backup stator arms, wherein the backup rotor is rigidly connected to the rotatable shaft; and
 a plurality of permanent magnets attached to the plurality of backup rotor arms,
 wherein the backup rotor is configured to rotate with respect to the backup stator such that the plurality of permanent magnets provide a magnetic flux to the plurality of backup stator coils to produce a current in the plurality of backup stator coils when operating in a generator mode and to provide a torque to the rotatable shaft when operating in a motor mode.

15. The electro-dynamo device of claim 13, wherein the integrated backup power generation mechanism comprises a plurality of permanent magnets attached to the rotor.

16. The electro-dynamo device of claim 15, wherein a permanent magnet is attached to the rotor between the plurality of rotor arms such that one end of the permanent magnet abuts a rotor arm and an opposing end of the permanent magnet abuts an adjacent rotor arm.

17. A method for providing for electrical generation, comprising:
 positioning a rotor comprising a dysprosium core material and a plurality of rotor arms within a cylindrical stator comprising the dysprosium core material and a plurality of stator arms such that the plurality of stator arms is evenly spaced from the plurality of rotor arms;
 positioning a plurality of bulk high-temperature superconductors on the plurality of rotor arms proximate to an air gap between each rotor arm and each stator arm; and
 configuring a plurality of stator coils around the plurality of stator arms to provide a magnetic flux to the plurality of bulk high-temperature superconductors for charging via the dysprosium core material when receiving direct current and to create an alternating current when exposed to rotating magnetic fields from the plurality of bulk high-temperature superconductors when the rotor is rotating in generator mode.

18. The method of claim 17, further comprising interspersing ferromagnetic laminated strips with dysprosium laminated strips to create the dysprosium core material such that an easy axis of magnetization of each strip is in a direction corresponding to a direction of a desired magnetic field flow and such that the dysprosium laminated strips provide magnetic flux at cryogenic operating temperatures and the ferromagnetic laminated strips provide magnetic flux at operating temperatures higher than cryogenic operating temperatures.

19. The method of claim 17, further comprising nesting a coil of non-superconducting wires within a coil of superconducting wires to create a stator coil such that the coil of superconducting wires is operative to provide a charging magnetic flux to the plurality of bulk high-temperature superconductors when receiving direct current, and the coil of non-superconducting wires is operative to produce alternating current when subjected to a trapped magnetic flux from the plurality of bulk high-temperature superconductors during rotation of the rotor.

20. The method of claim 17, further comprising positioning a plurality of permanent magnets between the plurality of rotor arms to provide magnetic flux to the plurality of stator coils.

\* \* \* \* \*